United States Patent [19]

Dolezal et al.

[11] Patent Number: 4,888,776
[45] Date of Patent: Dec. 19, 1989

[54] RIBBON BEAM FREE ELECTRON LASER

[75] Inventors: Franklin A. Dolezal, Reseda; Robin J. Harvey, Thousand Oaks, both of Calif.

[73] Assignee: Hughes Aircraft Company, Los Angeles, Calif.

[21] Appl. No.: 283,663

[22] Filed: Dec. 13, 1988

[51] Int. Cl.[4] .............................................. H01S 3/00
[52] U.S. Cl. .................................... 372/2; 315/111.81; 372/92; 372/69; 372/9; 372/88
[58] Field of Search .................... 372/69, 2, 88, 96, 99, 372/9, 92, 87; 315/111.81

[56] References Cited

U.S. PATENT DOCUMENTS 4,545,056  10/1985  Wortman et al. ...................... 372/2
4,697,272   9/1987  Harvey .................................. 372/2

*Primary Examiner*—Leon Scott, Jr.
*Attorney, Agent, or Firm*—V. D. Duraiswamy; P. M. Coble; W. K. Denson-Low

[57] ABSTRACT

An FEL array is comprised of adjacent FEL modules. Each module preferably uses a ribbon beam plasma-anode E-gun (PAG) or another plasma-assisted E-gun to produce a planar E-beam that interacts with a planar wiggler magnetic field. The modules may share a common electron gun. A control signal is input through a phase priming array to preselect the radiation mode. A planar, distributed Bragg resonator/reflector is used to set up a high-Q cavity, enabling the low gain module to produce high power radiation. The FEL modules are arranged in an array to reduce the output radiation flux density while achieving high output power density in the far-field, and to permit beam steering by phase control of individual modules. The relatively low current density of the individual E-guns lessens the size of the guiding magnetic field in each module to the extent that the wiggler magnetic field alone is sufficient to perform this guiding function.

35 Claims, 11 Drawing Sheets

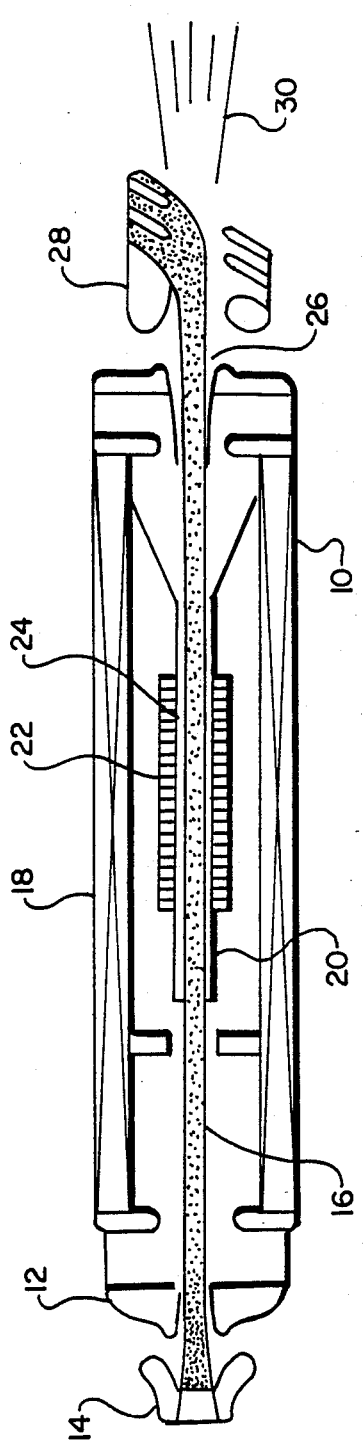
FIG. 1. (PRIOR ART)
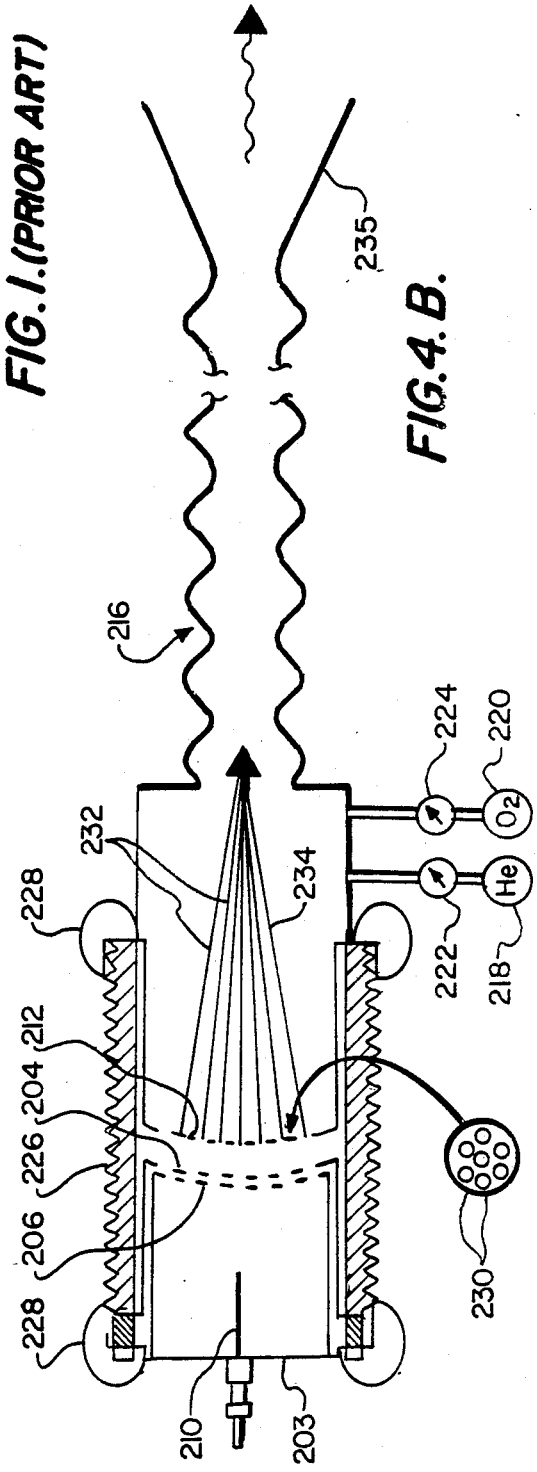
FIG. 4.B.

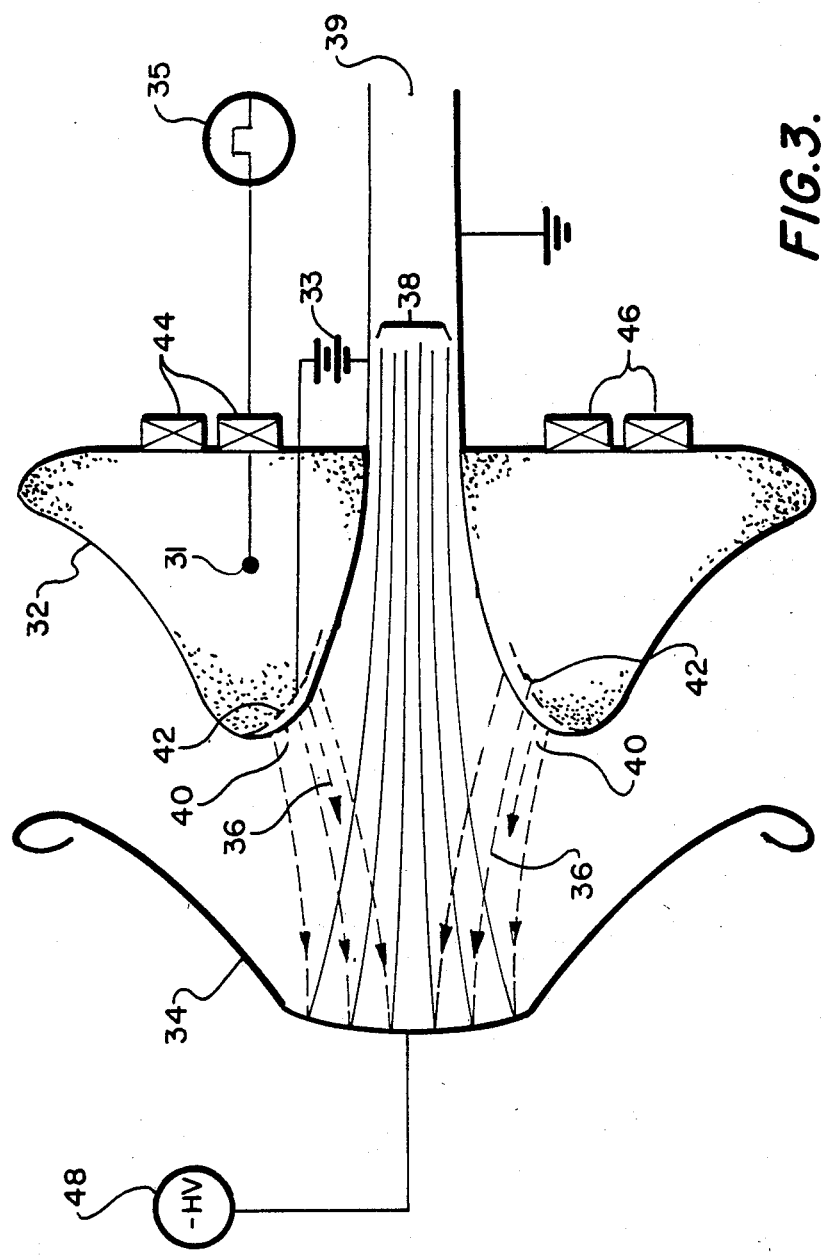

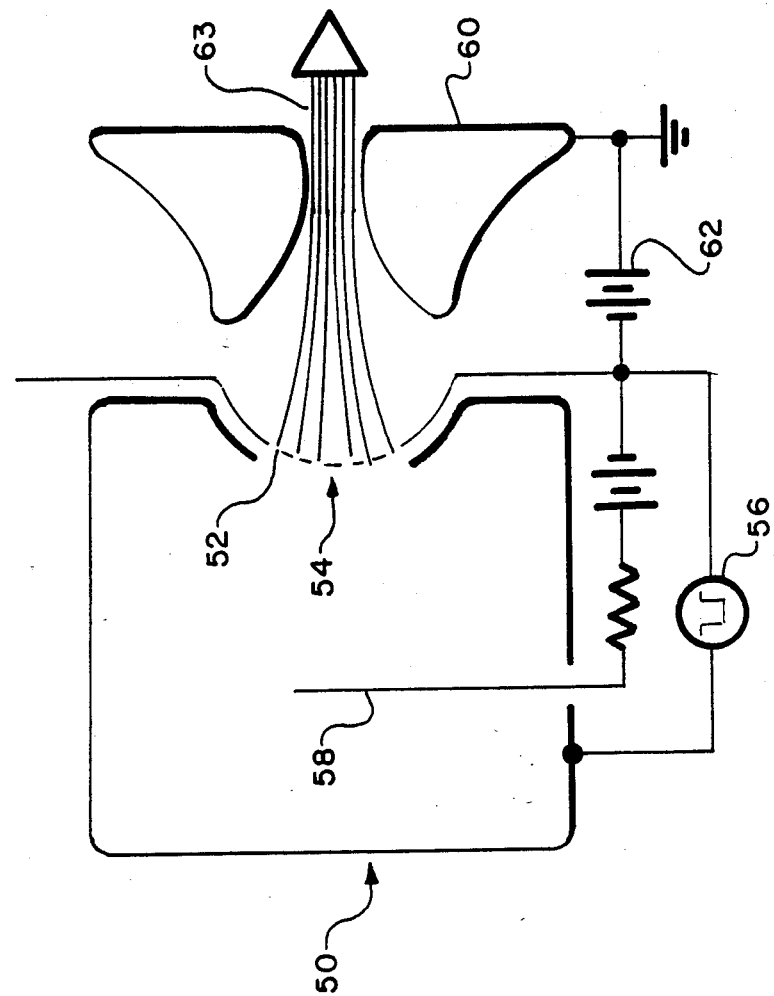
FIG.4.A.

RIBBON BEAM FREE ELECTRON LASER

BACKGROUND OF THE INVENTION

1. Field of the Invention

This invention relates to free electron lasers (FEL), and more particularly to high power microwave and millimeter wave FELs.

2. Description of the Related Art

An FEL amplifies short-wavelength radiation by stimulated emission, using a beam of relativistic electrons. The electrons are not truly "free", since they are under the influence of magnetic forces which cause them to radiate, but they are "free" in the sense that they are not bound into atoms as in the case of a conventional laser. The FEL radiation is usually produced by passing the electrons down a magnetic device known as an undulator or "wiggler", in which the electrons are forced to execute a periodic oscillatory trajectory in space. The wiggler may produce a helical field using a bifilar helical winding, a linearly polarized field using a set of alternating polarity magnets, an electrostatic field, or an electromagnetic field. In the presence of a wiggler field and the electromagnetic wave being amplified, the traveling electrons see an oscillating field everywhere except in certain regions where they bunch together and travel in synchronism. This bunching enables them to radiate coherently as they are oscillated by the wiggler field, and release appreciable amounts of power. A background article on this type of device is A. Hasegawa, "Free Electron Laser", *Bell Technical Journal*, vol. 57, no. 8, Oct. 1978, pgs. 3069–3089.

In any event, the electron density of the electron beam (E-beam) is very high, on the order of $10^9$ to $10^{12}$ electrons per cubic centimeter. The electron beam typically travels through a vacuum or a near vacuum.

In a typical FEL, the electrons are accelerated in a diode structure or electron gun ("E-gun"). The gun typically operates in pulsed form, from single-shot to 1000 Hz. A typical gun consists of a hot or cold cathode and either focusing elements or a guide magnetic field. The acceleration of the electrons in the electron beam ("E-beam") primarily occurs in the diode structure or E-gun and in any acceleration stages located past the E-gun. The energy of the electron beam produced by the E-gun and accelerator may be in the relativistic range for electrons, that is, on the order of $mc^2=510$ kV. The energy may be as high as 1000 MV. The typical operating range for a microwave FEL could be about 150 to 700 KV.

Most FEL applications are for the generation of radiation in the ultraviolet to infrared bands and require a large, high energy accelerator. However, FELs having High Power Microwave (HPM) outputs are being developed for certain applications. Some of these applications are discussed in Florig, H. Keith, "The Future Battlefield: A Blast of Gigawatts?", *IEEE Spectrum*, March, 1988, pages 50–54.

FIG. 1 depicts a typical prior art HPM FEL. In FIG. 1, FEL 10 has an electron gun having an anode 12 and a cathode 14. The gun emits an accelerated electron beam 16 that is focused and confined by a guidefield solenoid 18, and passed through a reflector 20, and a metal waveguide 24. The beam also passes through a wiggler magnet array 22 which imposes an oscillating trajectory upon the electron beam, causing the E-beam to emit radiation. The E-beam and the emitted radiation 30 pass through FEL output 26. The E-beam is collected and recycled by a depressed collector 28, while the output radiation 30 proceeds in a linear path towards a target. Assuming that the combined length of the wiggler and reflector/resonator assembly is 50 centimeters and that a 225 kV E-beam is used, the FEL depicted in FIG. 1 will generate about 60 kW of power at a frequency of about 30 GHz.

FIG. 2 is a graph depicting typical prior art FEL operating conditions. FIG. 2 shows the frequency and gain of an FEL as a function of the operating beam voltage.

The FEL depicted in FIG. 1 uses a single high-current density E-beam. This approach has several disadvantages. First, field-emission diodes are typically required as electron guns to generate the high-current E-beams of the type needed for a HPM FEL. However, such field-emission diodes have very short closure times, on the order of nanoseconds, and therefore limited pulse lengths and limited repetition times. Field-emission diodes also tend to produce poor quality electron beams, thereby reducing the portion of the beam involved in the interaction as well as its conversion efficiency.

Second, these single high-current density E-beams have a tendency to "blow-up" due to their own very high space charge, and thus require large guiding magnetic fields for beam propagation.

A third problem with single high-current density E-beams are the power-handling difficulties created at the output end of the FEL.

A single gun, sheet or ribbon electron beam FEL is disclosed by Booske, J. H., in "Low-Voltage, Megawatt Free-Electron Lasers At a Frequency Near 300 GHZ", *Microwave and Particle Beam Sources and Propagation* (1988), SPIE Volume 873, pages 133–142. The Booske article discloses a millimeter-wave FEL operating at a frequency between 150 and 300 GHz, with an output of about 1 megawatt. This device uses a thermionic Pierce gun as the accelerator. The drawbacks of using such thermionic guns include limited current density, the requirement of heater power, radiation of heat, and susceptibility to poisoning. Also, grid control in such guns is difficult since the grid must operate at the high voltage of the gun cathode.

SUMMARY OF THE INVENTION

It is a feature and advantage of the present invention to produce tunable and steerable high power microwave to high power millimeter wave radiation using a gun that requires relatively low input power.

It is another feature and advantage of the present invention to reduce the flux density near the FEL output aperture to facilitate coupling of the FEL with focusing and directing optics and to prevent air breakdown.

It is yet another feature and advantage of the present invention to provide a FEL using power-conditioning system components that are more reliable, maintainable, and do not suffer from the power density and heat dissipation problems of single high-current source FELs.

It is yet another feature and advantage of the present invention to provide a FEL which is compact and uses inexpensive, mass-produced components.

These and other features and advantages are accomplished in a FEL array comprising a plurality of adjacent FEL modules. While thermionic or comparable E-guns can be used, each module preferably uses a plasma-anode E-gun (PAG) or a plasma-assisted hollow cathode plasma (HCP) E-gun to produce a relativistic planar, ribbon E-beam that interacts with a planar wiggler magnetic field. A control signal is input through a phase priming array to preselect the radiation mode. A planar, distributed Bragg resonator reflector is used to set up a high-Q cavity, enabling the low gain module to produce high power radiation. The FEL modules are arranged in an array to reduce the output flux density while achieving high output power, and to permit beam steering by phase control of individual modules and by pre-selection of specific cavity modes of the resonator. The relatively low current density of the individual E-guns lessens the size of the guiding magnetic field in each module to the extent that the wiggler magnetic field alone is sufficient to perform this guiding function.

Instead of arranging a plurality of adjacent FEL modules into a FEL array, a single module may be used.

The design of the module is similar to the modules used in the FEL array discussed above, except that each module may have a plurality of coupled module sections. Each module section receives an electron beam from the E-gun and has its own waveguide cavity section, wiggler magnets, corrugated reflectors, and output. A phase priming array is coupled to a waveguide cavity section of one of the module sections.

The plasma-assisted E-guns also have the advantages of requiring no heater power, being insensitive to poisoning, and in the case of the plasma-assisted E-gun achieving current modulation with a low-voltage control pulse from ground potential.

For maximum system efficiency, the relative E-beam energy spread should be less than the linewidth of the wiggler array. The output power of the FEL array can be scaled to 100 MW or higher, and has a rapidly tunable frequency typically between 4 to 100 GHz. The system operates below the threshold for air breakdown at the typical one square meter steering antenna array.

These and other features and advantages of the invention will be apparent to those skilled in the art from the following detailed description of preferred embodiments, taken together with the accompanying drawings, in which:

DESCRIPTION OF THE DRAWINGS

FIG. 1 is a cross-sectional view of a typical prior art High Power Microwave Free Electron Laser.

FIG. 3 is a diagram of a plasma-assisted plasma-anode E-gun.

FIG. 4a is a diagram of a second type of plasma-assisted E-gun.

FIG. 4b is a diagram of a preferred embodiment of the second type of plasma-assisted E-gun.

DETAILED DESCRIPTION OF THE INVENTION

Figure 7:
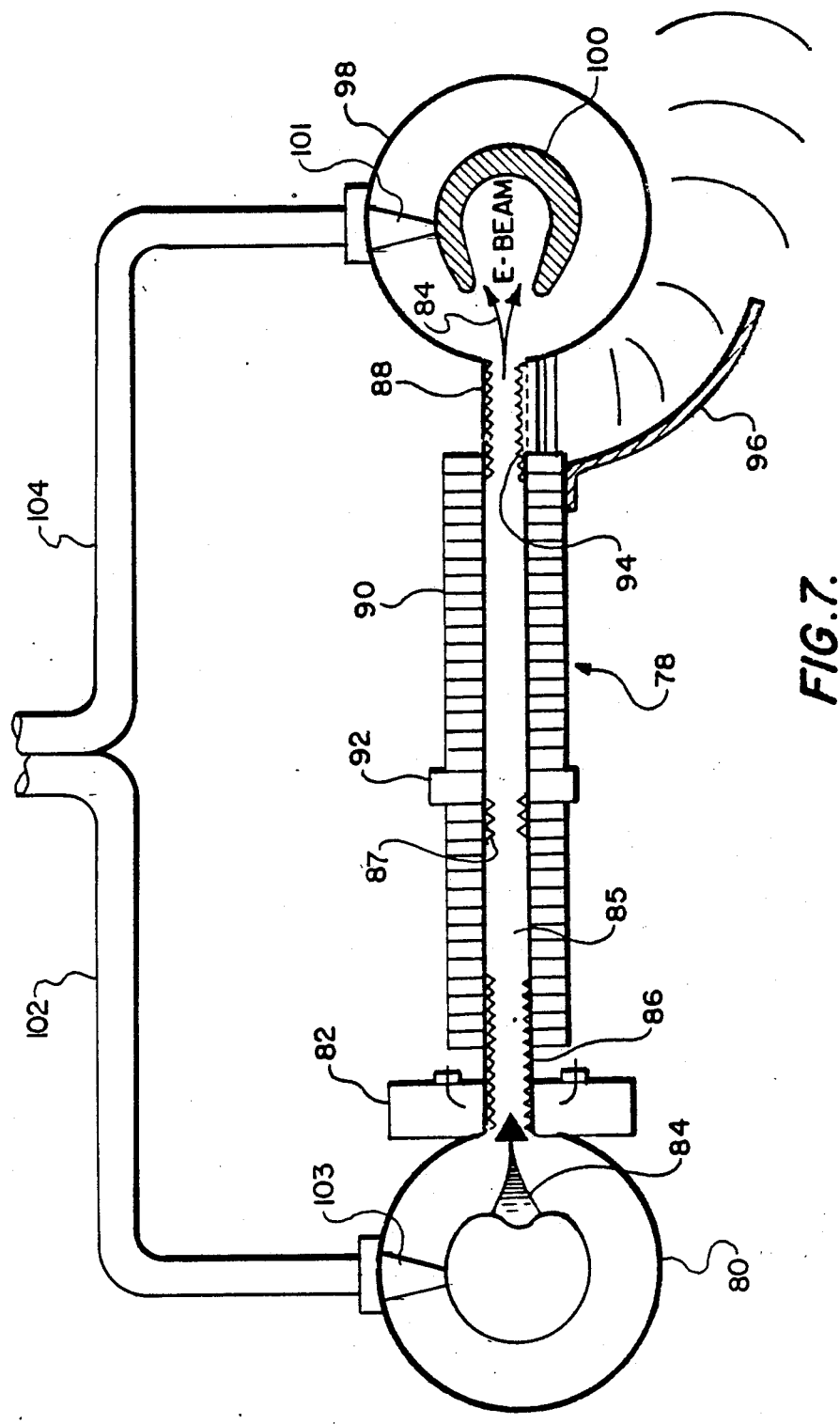
FIG. 7 is a side view of a first embodiment of an FEL module according to the present invention.

FIG. 7 is a side view of a first embodiment of the present invention. In FIG. 7 a plasma chamber 82 cooperates with a plasma-assisted E-gun 80 to produce an electron beam 84 that travels through waveguide 85 to a depressed collector 100. Waveguide 85 preferably has Bragg reflectors 86 at the input end of the waveguide, Bragg reflectors 88 at the output end, and optional Bragg reflectors 87 at the center. As the electron beam 84 travels through Bragg reflectors 86 it passes through wiggler magnets 90 which confine the beam, impart an oscillating trajectory upon the electron beam to produce radiation, and also confine the E-beam within the waveguide 85. The spacing between the wiggler magnets determines the frequency of the oscillating electron beam. E-beam 84 also passes through an optional steering magnet 92 positioned on both sides of the wiggler magnet array that is used to optionally redirect the E-beam beyond optional reflectors 87 for horizontal or transverse steering of the radiation field. The strength of steering magnet 92 differs from the strength of wiggler magnets 90 so that e-beam 84 is directed at a desired transverse angle. Since the output radiation tends to follow the e-beam direction, the output radiation is also steered in a horizontal direction. The E-beam then passes through the second set of Bragg reflectors 88 where the radiation is coupled through slotted couplers 94 and passes out of FEL module 78 via the quasi-optical antenna coupling 96. E-beam 84 is collected in an optional depressed collector section 98 which includes a horseshoe-shaped collector 100. High voltage cable 104 provides a high voltage to depressed collector section 98 through bushing 101, and high voltage cable 102 provides a similar high voltage to E-gun 80 through bushing 103.

Figure 2:
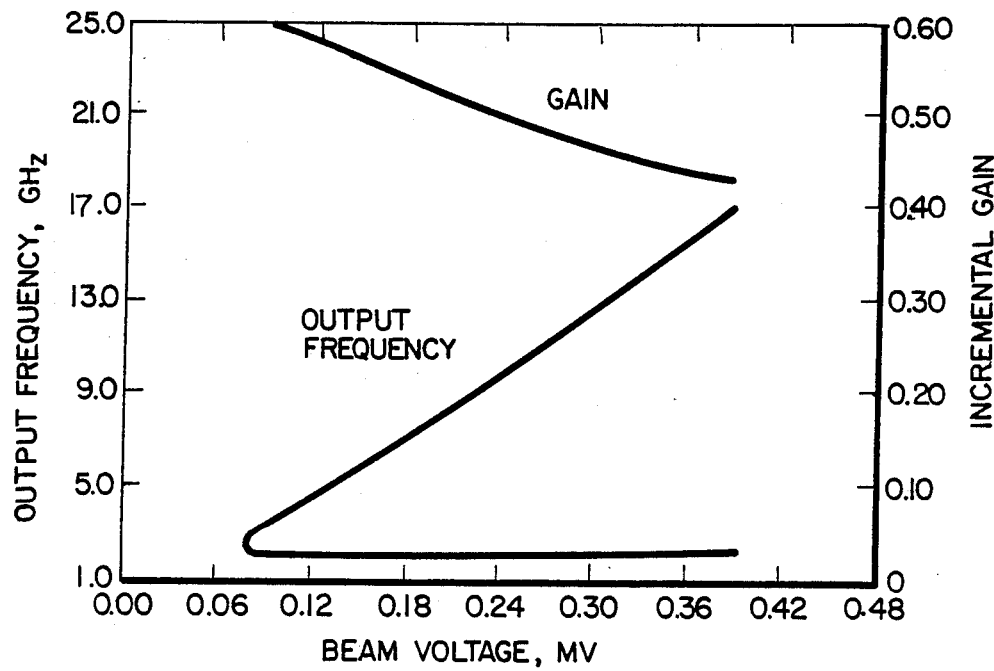
FIG. 2 is a graph of typical FEL operating conditions showing frequency and gain as a function of operating beam voltage.

An illustrative example is helpful in describing the FEL according to the present invention, such as the one depicted in FIG. 7. Assuming that the FEL in FIG. 7 uses a 5 cm. period wiggler-magnet array 90 with a 500 Gauss magnetic field on its axis, and the height of waveguide 85 is 4 cm, then, as shown by the graph in FIG. 2, the desired range of operating conditions may be obtained by an E-beam having up to 360 KV in energy. This corresponds to a frequency of 13 GHz as shown by FIG. 2. This FEL will operate well into the Raman regime where collective interactions are important because they lead to increases in gain. The gain of an FEL using a plasma-anode gun operating at 10 A/cm$^2$ is also shown in FIG. 2; FIG. 2 indicates that operation can be extended down to the current densities available from plasma-anode E-guns. This hypothetical example indicates that the FEL array according to the present invention may be adapted to provide high microwave powers and may allow the output to be tuned over a wide frequency range.

A plasma-assisted electron gun may be used to generate the electron beam in the FEL module discussed above. One such E-gun is the plasma-anode electron gun taught in U.S. Pat. No. 4,707,637 issued Nov. 17, 1987 to Harvey (one of the inventors of the present invention) and assigned to Hughes Aircraft Company, the assignee of the present invention. In this plasma-anode gun, a cold cathode is employed which is formed of a material having a relatively high ratio of emission of secondary electrons to impinging ions. A combined anode and ion source may include an annular chamber for containing a gas plasma and arrangements for selectively releasing ions to impinge upon the cathode, thereby generating secondary electrons. The anode may be hollow and may have a central opening, and the electrons are directed through the opening in the anode to form an electron beam.

The plasma-anode E-gun may include any of the following additional features and modifications. The cathode may be at a very substantial negative potential, such as several tens of kilovolts up to 100 kilovolts or more negative with respect to the combined anode and plasma source. The ratio of secondary electrons to incident ions may be on the order of 14 or 15 electrons per ion, with a cathode potential on the order of $-100$ kilovolts.

In another embodiment the cathode may be relatively flat or slightly dished, and the annular anode electrode may release ions to impinge inwardly on the cathode structure, whereas the emitted electrons may be drawn back toward the combined anode and ion source and pass through the central opening thereof, to form a focused electron beam along the axis. In this process the electrons travel along significantly different trajectories from the ions, which are coming in toward the cathode peripherally and are arranged to bombard the cathode according to the desired electronic emission density.

Pulses of ions may be controlled by one or more wire-anode control electrodes extending into the plasma chamber, which is filled with a low pressure gas such as helium. When the control electrode is pulsed, for example, to a positive voltage on the order of a kilovolt, plasma electrons are trapped by the electric fields of the wire and ionize the gas by the wire-ion-plasma mechanism, with the resulting ions being ejected from openings facing the cathode, as described in U.S. Pat. No. 3,949,260, issued to J. R. Bayless and Robin Harvey and assigned to Hughes Aircraft Company, the assignee of the present invention.

A supplemental grid electrode at a relatively low positive voltage, such as 50 to 100 volts, may also be provided adjacent the openings in the ion source and anode which face the cathode, to preclude leakage of the ions during the formation or decay of the plasma in the plasma chamber, thus sharpening or modulating the pulse wave form of the ion beam.

In another alternate embodiment, the ion source may be divided into two coupled chambers, and release of ions may be accomplished by pulsing an electrode in the rear chamber remote from the openings facing the cathode.

In another alternate embodiment, supplemental magnets may be employed to facilitate the establishment of a plasma by the crossed-field discharge mechanism within the ion source by trapping the plasma electrons and increasing the formation of ions within the annular ion source.

In another alternate embodiment, the energy of the ions bombarding the cathode is optimized for maximum secondary yield and minimum power dissipation on the cathode by providing for operation of the ion source as an intermediate electrode set at, for example, 130 kV relative to the cathode, while the electrons are accelerated to a different, or higher energy by additional anode potential stages.

FIG. 3 is a side view of the plasma-anode E-gun taught in U.S. Pat. No. 4,707,637. In FIG. 3, ion source chamber 32 is the source of positive ions used to generate the electron beam. In FIG. 3 the trajectories of the positive ions are indicated generally by the dashed lines 36, and the trajectories of the electrons which are generated when the positive ions impact on cathode 34 are indicated by solid lines at 38. The openings 40 for the ions are shown angled toward cathode 34 to force the ions to follow the trajectories indicated by the dashed lines 36. To prevent undesired leakage from the openings 40, a supplemental grid 42 is provided. Grid 42 is permanently biased at a relatively small negative potential such as about 70 volts with respect to the openings 40.

In operation, positive ions are emitted from ion source 32 which serves as the anode of the electron gun. The positive high energy ions travel along lines 36 and bombard cold cathode 34 to stimulate the emission of electrons by cathode 34. Cathode 34 is connected to a negative high voltage source 48. The emitted electrons shown by lines 38 travel out of the E-gun. A wire-anode electrode 31 is attached to the plasma source 32 to provide excitation energy to the plasma. Low voltage control pulses are also applied to plasma source 32 via control line 35 to control the emission of ion pulses, which in turn controls the emission of E-beam pulses.

The plasma anode E-gun depicted in FIG. 3 has been used to generate E-beam currents up to 6.5 A at 90 kV, and at higher voltages to generate current densities of 10 A/cm$^2$.

A second type of electron gun that may be used in the present invention employs a hollow cathode, an apertured grid located adjacent to multiple outlets from the cathode, and means for establishing an electrical glow discharge through a gas between the cathode and the grid to generate a plasma within the cathode. The grid has a generally high transparency, but with apertures small enough to prevent the passage of plasma through the grid. A generally transparent anode on the opposite side of the grid from the cathode maintains a high positive electric potential to extract an electron beam from the plasma behind the grid. In the preferred embodiment of the electron gun, the inner cathode surface is formed from a chemically active metal, and the gas is doped with a trace amount of oxygen to form an oxide of the metal, thereby enhancing the secondary electron yield from the cathode and permitting operation in the lower pressure range. Beam losses are reduced by providing the cathode, grid and anode with respective sets of apertures that are mutually aligned. The grid, anode and end surface of the cathode are curved concave with respect to the beam to geometrically focus the beam, while the outer surface of the hollow cathode is cylindrical to generate an electron beam.

FIG. 4a is a diagram depicting a first embodiment of the second type of E-gun discussed above. In FIG. 4a, a hollowed cathode enclosure 50 is filled with an ionizable gas at the desired pressure. Gases such as hydrogen and neon may be used, but helium is preferred because of its ability to withstand high voltage levels.

A discharge grid 52 is located just outside an apertured outlet surface 54 in the hollow-cathode wall. A large cathode-to-grid area ratio is provided to produce an efficient confinement of ionizing electrons inside the hollow cathode, and thus high density plasma generation at low gas pressures. A plasma is created and modulated within the hollow-cathode by applying to the hollow-cathode a negative pulse relative to the discharge grid, from a discharge pulser 56. A keep-alive anode wire 58 is inserted into the hollow-cathode and biased at about 1 kV to maintain a low current (about 10 mA) continuous discharge between pulses, so that the high current discharge pulse may be initiated on-command with low jitter. The discharge grid 52 has a high optical transparency on the order of about 80%, but with very small apertures of about 250 micron diameter through which electrons are extracted from the plasma. By controlling the plasma density with the discharge pulser and holding back the plasma behind the grid, long duration discharge pulses can be generated without having the plasma short-out the structure at high voltage levels.

A high-density plasma, on the order of about $3 \times 10^{12}$ cm$^{-3}$ at 60 A/cm$^2$ current density, is formed behind the grid. Electrons are extracted from the plasma and accelerated to a high energy in a high current density emission by applying a high positive potential to an anode electrode 60, which is located on the opposite side of grid 52 from the hollow cathode 50. Electric field stress in the gap between the anode 60 and grid 52 is held below a value which is limited by field emission and subsequent high voltage breakdown to about 100 kV/cm. The voltage may also be limited by Paschen breakdown if the product of the gas pressure and gap spacing, or Pd, exceeds a typical value of 0.3 Torr-cm. Paschen breakdown can be avoided at very high beam voltages by using a multi-stage accelerating scheme in which the total anode potential is graded over several anode structures separated by small gaps.

The hollow-cathode material in the electron gun comprises a metal, preferably a non-magnetic metal such as stainless steel, molybdenum, tungsten or chromium. These materials provide adequate secondary-electron emission for operation of a hollow-cathode glow discharge. A high secondary electron yield discharge from the cathode may be obtained by coating the cathode surface with an oxide of a light, chemically reactive metal such as aluminum, beryllium or magnesium. This is achieved by forming a cathode from the desired metal and doping the filler gas with a trace amount of $O_2$, preferably about 0.2 mTorr. This arrangement results in a thin layer of metallic oxide on the hollow-cathode surface, which lowers the work function and enhances the cathode's secondary electric yield. The higher yield increases the ionization rate, and allows the generation of a high density plasma at lower pressure. This in turn makes possible the use of large gap spacings for very high voltage electron guns, on the order of 400 kV without suffering Paschen breakdown. The extraction voltage is provided to the anode by a high voltage source 62. The electron beam 63 travels out of the E-gun for use in the FEL module.

While a sufficiently high beam current density can theoretically be obtained by simply increasing the ratio of the anode emitting area to the spacing between the grid and anode, in practice the beam will become defocused when the anode aperture diameter becomes a significant fraction of the grid-anode gap. However, a net high perveance (defined as $I/V^{3/2}$, where I is the beam space-charge-limited current and V is the anode voltage) is obtained by using multiple apertures. In the preferred embodiment of the second type of plasma-assisted E-gun, illustrated in FIG. 4b, a hexagonal array of circular apertures in the hollow cathode is aligned with a similar array of apertures 230 in the anode and grid, so that the total perveance is equal to the perveance per aperture multiplied by the number of apertures. By using an electron-trajectory-following computer code which accounts for space-charge fields, the beam optics can be designed to generate an array of electron beamlets 232 which do not intercept the anode electrode 212. The cathode apertured outlet 206, discharge grid 204 and anode 212 are preferably curved concave with respect to the beam to obtain a geometric focusing of the beamlets which merge into a single, circular cross-section beam 234, injected into the free electron laser.

Ionization of the filling gas by the beam electrons produces ions that neutralize the beam and prevent space-charge blowup. Stable beam propagation with an equilibrium beam diameter is obtained by balancing the remaining outward thermal pressure in the beam with the magnetic self-pinching Bennett force, and the electrostatic confining force of the positively charged ions. The magnetic force arises from the axial current in the beam producing an azimuthal magnetic field. This field acts back upon the current, to generate an inward directed force on the beam 234 as it emerges from an anode 230.

The plasma-assisted high-power microwave generator depicted in FIG. 4b and discussed above is disclosed in U.S. patent application Ser. No. 181,279 filed Apr. 14, 1988 to Schumacher et al, and assigned to Hughes Aircraft Company the assignee of the present invention.

Figure 5:
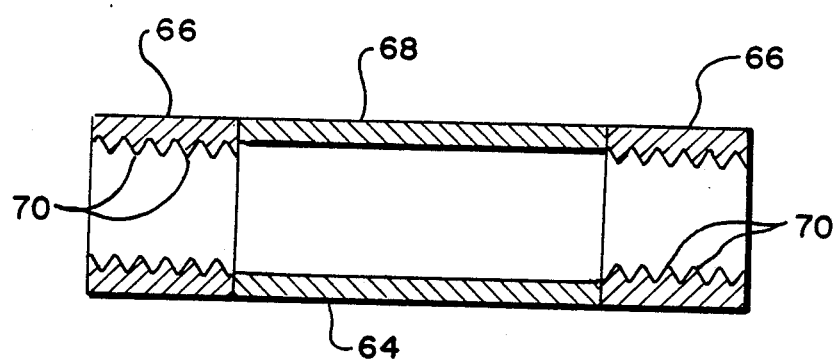
FIG. 5 is a cross-sectional view of a resonator cavity using Bragg reflectors.

The FEL modules according to the present invention preferably use resonating cavities having corrugated or Bragg reflectors therein for confining the radiation field while allowing the electron beam to pass. U.S. Pat. No. 4,745,617 issued May 17, 1988 to Harvey and assigned to Hughes Aircraft Company, the assignee of the present invention, teaches methods of optimizing the design of ideal high-Q resonant cavities formed by an overmoded waveguide and axially opened distributed Bragg reflectors. It also teaches particular microwave reflector structures which may be fabricated in accordance with those methods. The methods and structures taught in U.S. Pat. No. 4,745,617 may be used in the FEL modules according to the present invention. FIG. 5 depicts one such resonating cavity structure. In FIG. 5, a pair of Bragg reflectors 66 are positioned at opposite ends of the waveguide 68 to form the resonator 64. Internally directed teeth 70 at each end of resonator 64 represent the specially shaped corrugated Bragg reflectors.

U.S. Pat. No. 4,697,272 issued Sept. 9, 1987 to Harvey and assigned to Hughes Aircraft Company, the assignee of the present invention, teaches another corrugated distributed Bragg reflector design that may be used in the FEL module according to the present invention. This particular Bragg reflector is a corrugated reflector for coherent reflection of the power in a wave at a specified wavelength, having a hollow cylindrical member with a longitudinal axis, and a plurality of blazed vane means, coaxially disposed internally within this hollow cylindrical member along the axis. The blazed vane means preferably have corrugations configured so as to retro-reflect the incident wave according to the Bragg condition for gratings, to eliminate higher order modes of reflection of the wave, and to maximize retro-reflection and minimize forward scattering according to the Bragg conditions for gratings. Two such reflectors can be configured into a laser resonator by placing them at opposite ends of a matching waveguide.

Figure 6:
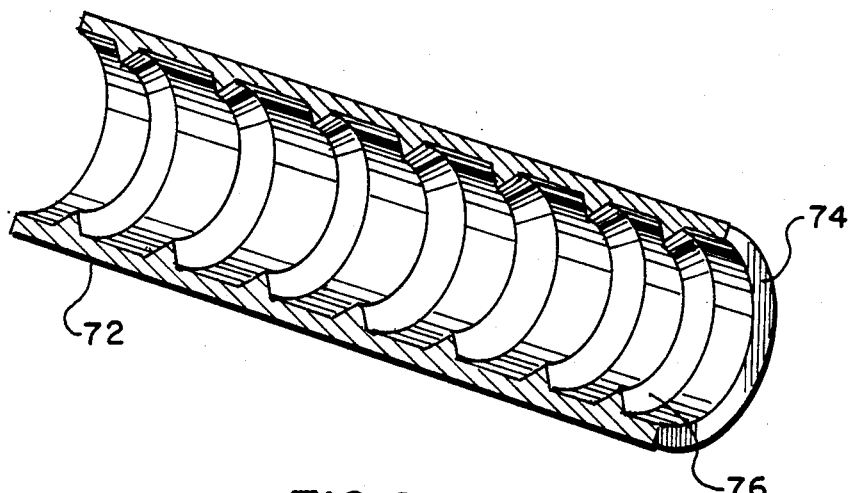
FIG. 6 is a perspective view of a Bragg reflector.

FIG. 6 depicts a reflector as taught in U.S. Pat. No. 4,697,272. In FIG. 6, blazed corrugated reflector 72 comprises a hollow cylindrical member 74 utilizing internal corrugations or vanes 76 which are blazed to have specific design angles to coherently reflect power at specified wavelengths and their second and third harmonics.

The Bragg reflectors and resonating cavities are used to confine the modes, while still allowing passage of the electron beam. Operation of the FEL module in the proper modes is important for optimal FEL output. The FEL is sensitive to operating voltage, but it is practical to repetitively select a single cavity mode. The Bragg reflectors, and plasma-assisted electron guns described above, are not limited to a cylindrical shape and preferably have a rectangular shape.

Figure 11:
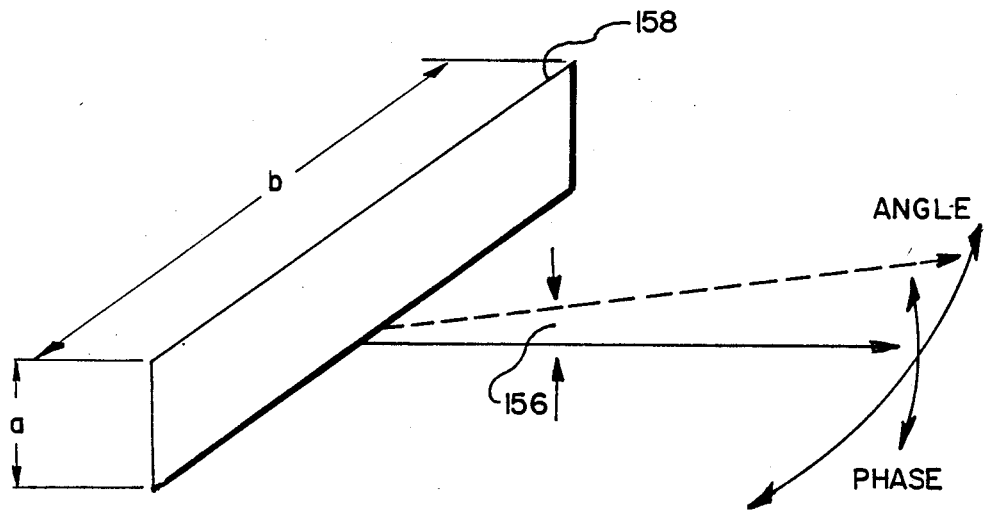
FIG. 11 is a drawing depicting the a and b dimensions of a ribbon electron beam.

The selection of modes will be discussed with respect to FIG. 11. In FIG. 11, a rectangular waveguide 158 has a short transverse dimension, a, for maximizing the magnetic field. The resulting electron wiggle motion of electron beam 156 is in the wide direction, b, of rectangular waveguide 158. The FEL module can therefore only excite modes with electric fields primarily in the b direction. The ribbon beam FEL according to one low-frequency embodiment of the present invention is arranged to operate near the cut off of the Transverse Electric $TE_{10}$ mode in order to couple to a high energy electron beam at a low frequency. The FEL is thus operated near cutoff in the backward-wave mode; it relativistically downshifts the frequency. FEL backward-wave modes may run so efficiently near the waveguide cutoff that Bragg reflectors at the end of the waveguide are not needed.

As far as parasitic modes are concerned, the relative variation in wave number with higher order $TE_{1m}$ modes is given by the equation $$\Delta k_{1m}/k_{10} = m^2\pi^2/2bk_{10}^2$$

where:
$k_{nm}$ = a wave number, where n is the mode index in the "b" direction and m is the mode index in the "a" direction.
$k_{1m}$ = wave number for the first non-vanishing mode in the "b" direction, the "a" direction index being arbitrary.
$k_{10}$ = wave number for the first non-vanishing mode in the "b" direction, with no dependence in the "a" direction.
b = width of the waveguide.

The maximum efficiency of an FEL operated without tapered wigglers is roughly given by $\frac{1}{4}N$, where N is the number of magnets used in the wiggler. This efficiency also defines the gain bandwidth of the wiggler, so the criteria for forcing low gain in the other 1m modes is to insure that $$b < \pi N^{\frac{1}{2}}/k_{10}.$$

Near the cutoff, $k_{10}$ approaches 0, so the criteria in the last equation is easily satisfied even with a small value for N. The higher order nm modes have a larger variation. In the case where n=0, the electric field is aligned transversely to the wiggle motion and no gain is expected. Thus, parasitic modes should not be a major problem for low frequency operation. At higher frequencies the desired FEL mode may be primed by the introduction of a small signal with the desired frequency and mode in advance of the laser pulse. When the FEL is pulsed the laser power builds only that mode.

Most FEL applications are for the generation of radiation in the ultraviolet to infrared band. Such FELs require large, high energy accelerators or E-guns. The present invention uses lower frequency energy so that the operating voltage and, therefore, the sizes of the power supplies and drivers become sufficiently small that mobile devices may be made which are capable of producing extremely high output power. The present invention produces radiation up to a frequency of at least 100 GHz.

Figure 8:
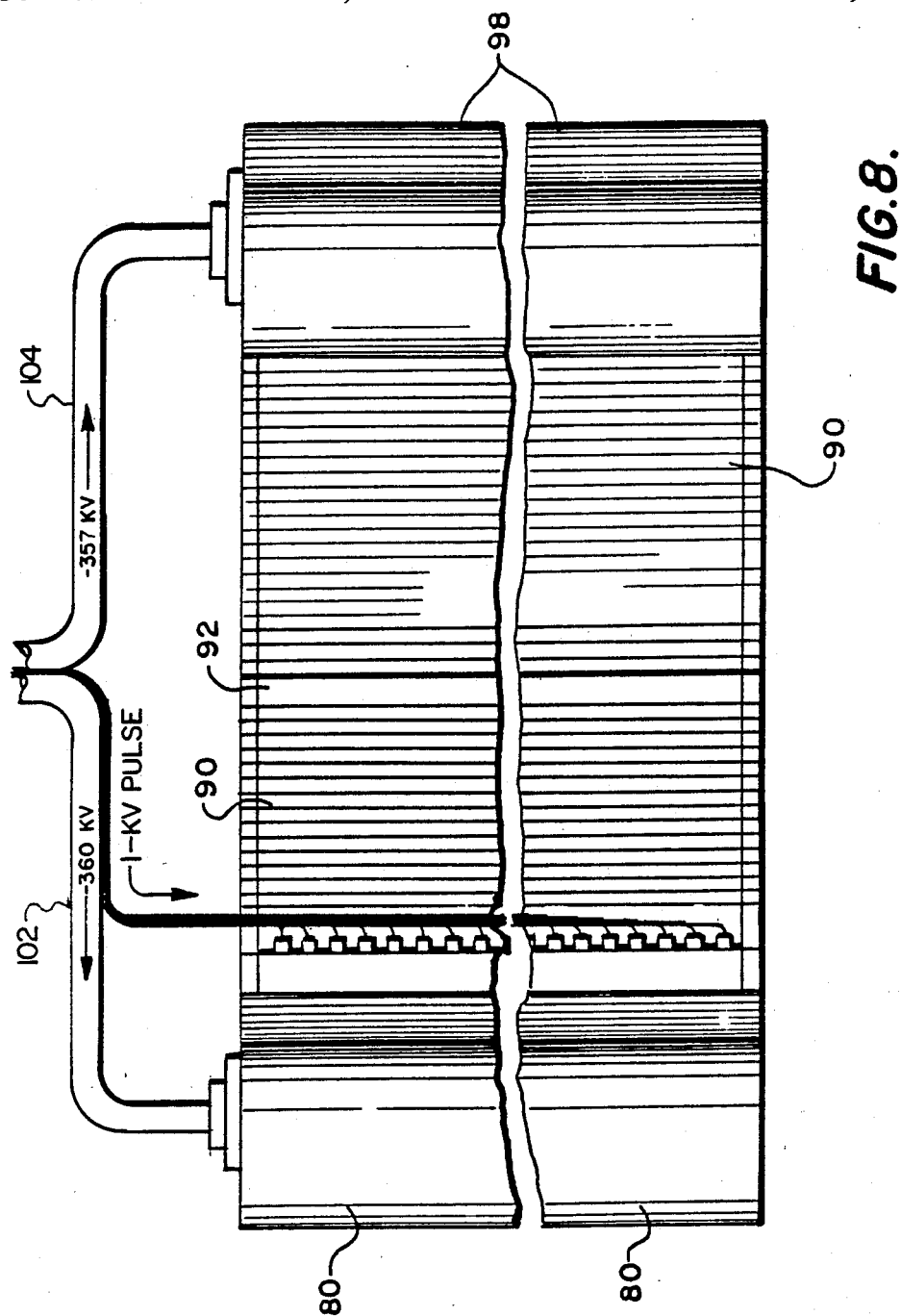
FIG. 8 is a top view of the first embodiment depicted in FIG. 7.

FIG. 8 is a top view of the first embodiment depicted in FIG. 7. In FIG. 8 a high voltage cable 102 provides approximately $-360$ kV to E-gun 80. A high voltage cable 104 provides about $-357$ KV to depressed collector 98. While the first embodiment is shown as having parallel magnet arrays past optional steering magnet 92, these magnets and the associated reflectors may be curved to accommodate the steering action of the electron beam with a focus at the beam centroid. Likewise, the side walls of cavity 85 may be covered with absorbing material to help dampen modes that intercept the side walls.

Figure 9:
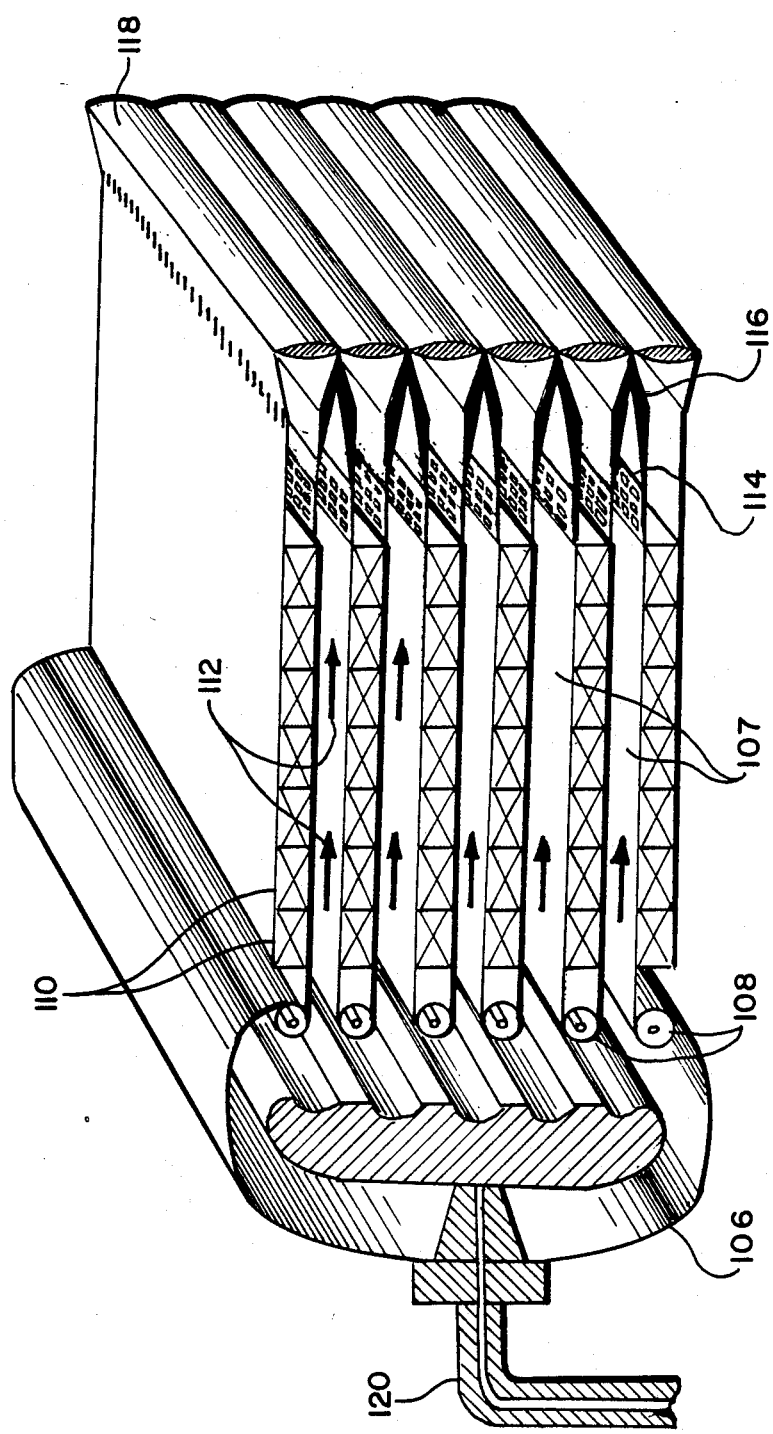
FIG. 9 is a perspective view of a second embodiment of an FEL module according to the present invention.

FIG. 9 depicts a second embodiment of an FEL module according to the present invention. In FIG. 9, the plasma chamber 108 cooperates with an E-gun cathode 106 to produce a series of E-beams 112. E-beams 112 travel through a series of parallel wiggler magnet arrays 110 along parallel waveguides 107 to a series of parallel tapered sections 116 for E-beam collection. The radiation emitted by the wiggling E-beams is coupled through slotted coupler 114 and is output through output dielectric window 118. Dielectric window 118 is designed to have the appropriate reflection coefficients and cylindrical lens curvature to match the waves of radiation and the structure, and to minimize the variation in intensity across the entire structure on the output side.

No depressed collector is shown in FIG. 9. Instead, the E-beams strike the tapered sections 116 at a small angle to minimize the amount of plasma (ionization) developed when the E-beam hits the tapered section. The development of plasma near the output detrimentally interferes with the radiation output. The tapered section should be as shallow as possible so that electrons are distributed over as large an area as possible. At the same time, the angle of the tapered section is chosen so that the microwave power is not scattered back to destroy the modes in the FEL module. The tapered section should be a good thermal conductor, have high temperature capability, and be made from a microwave absorbent material such as graphite.

Figure 10:
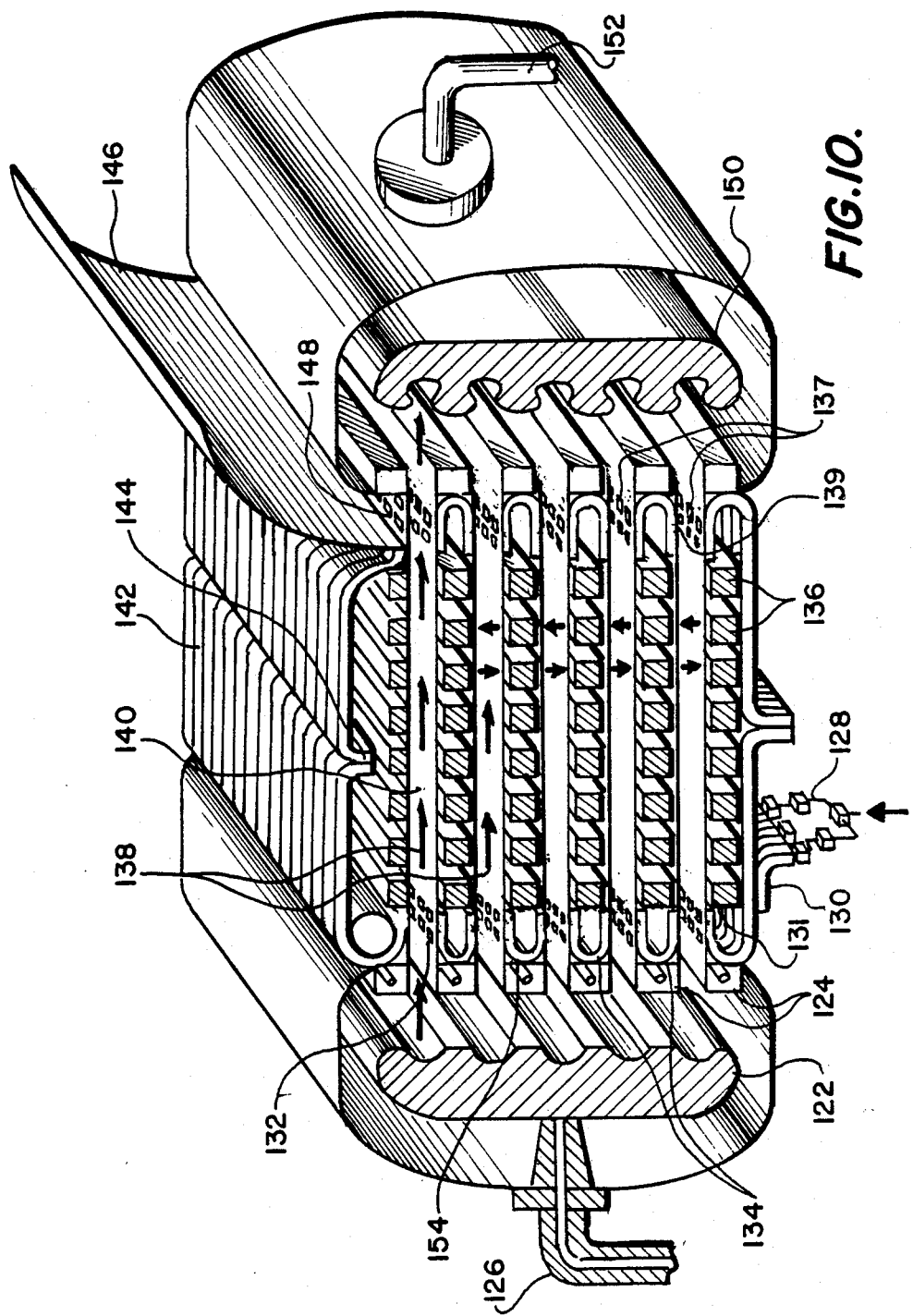
FIG. 10 is a perspective view of a third embodiment of an FEL module according to the present invention.

FIG. 10 depicts a third embodiment of an FEL module according to the present invention. In FIG. 10, a high voltage input cable 126 provides dc power to an electron gun that includes plasma chambers 124 and a cathode 122. In order to conserve space, a common cathode is used for each of the parallel overmoded waveguides 140. E-beams 138 travel along substantially parallel paths through parallel overmoded Waveguides 140 and through wiggler magnets 136 to depressed collector 150 where most of their energy is collected and recycled back to cathode 122. Each of the wiggler magnets 136, except those at the top and the bottom extremities of the FEL module, is used to impart a wiggler motion upon two distinct E-beams 138, one below it and one above it. This multiple use reduces the cost of the module as well as its size and weight. Waveguides 140 are overmoded; that is, they are operated at frequencies far above the cut-off frequency for the chosen frequency in order to prevent overheating of the structure.

In operation, a control signal is input at a frequency, which corresponds to the mode of the cavity that is desired to be excited, into the phase priming input array 128. In general, each higher order mode proceeds down the waveguide cavity at a particular transverse or horizontal angle. The transverse angle of some modes will match the desired transverse angle of the output radiation. When such modes are primed only those modes will lase. Thus, it is desirable to preselect those modes by using the control signal and phase shifters to achieve maximum gain of the output radiation in the desired direction.

Priming input array 128 is used to begin the priming signal in the correct mode. The input signal is split by a power splitter into 8 to 16 priming signals. The phase of at least one priming signal is shifted by a phase shifter to yield the desired phase of the priming signal at hole coupler 130. The phase shifters are conventional and operate by adjusting the optical path length of the priming signal to adjust its phase. The input phase to each coupler 130 is independently adjustable. Each coupler 130 is in turn coupled to a waveguide 131 which connects to the lower slotted couplers 137. Each cavity section 140 is coupled to each adjacent section by slotted couplers 137 and waveguide 139. Bragg reflectors (not shown) are located beyond the slotted couplers 137 to reflect the signals in the cavity. In this way, the transverse and longitudinal modes are preselected.

Hole-coupled tuning sections 144 above the lowermost and uppermost wiggler magnets 136 are slotted, and are used to adjust the phase by adjusting the optical path length of the waveguide return loop 142.

As E-beams 138 travel down waveguides 140, an oscillatory trajectory is imparted upon them by wiggler magnets 136. The resultant emitted radiation from the relativistic E-beams 138 is initially in phase with the priming signal and is coupled back and forth through a set of slotted couplers 132 in one waveguide to a waveguide coupler 134 and through another set of slotted couplers 132 to a parallel waveguide 140. Some of the radiation is coupled in this way in a vertical direction, while some of the radiation travels in the longitudinal direction through the waveguides and is coupled through the end slotted couplers 137 located at the end of overmoded waveguides 140. Such radiation is then coupled to an adjacent waveguide 140 via end waveguide couplers 139. Wave shifters may be added at waveguides 134 to ensure that the radiation coupled to adjacent waveguides remains in phase according to the phase primed input signal.

Eventually, most of the radiation travels through upper slotted couplers 148 and is collected by a quasiparabolic antenna 146 which directs it at a target. The electron beams are collected by depressed collector 150 which is powered by high voltage cable 152. Depressed collector 150 is optional, but improves the efficiency of the FEL module by recovering the energy in the electrons at a voltage nearly equal to that of the cathode 122. Depressed collector 150 may have a variety of configurations, including one in which the electron beam is steered to the side to be collected. See Dolezal F. A. et al, "E-guns and Depressed Collectors for Two-stage Free-electron Lasers", *IEEE Journal of Quantum Electronics,* Volume QE19, No. 3, Pages 309 through 315, March 1983.

Figure 12:
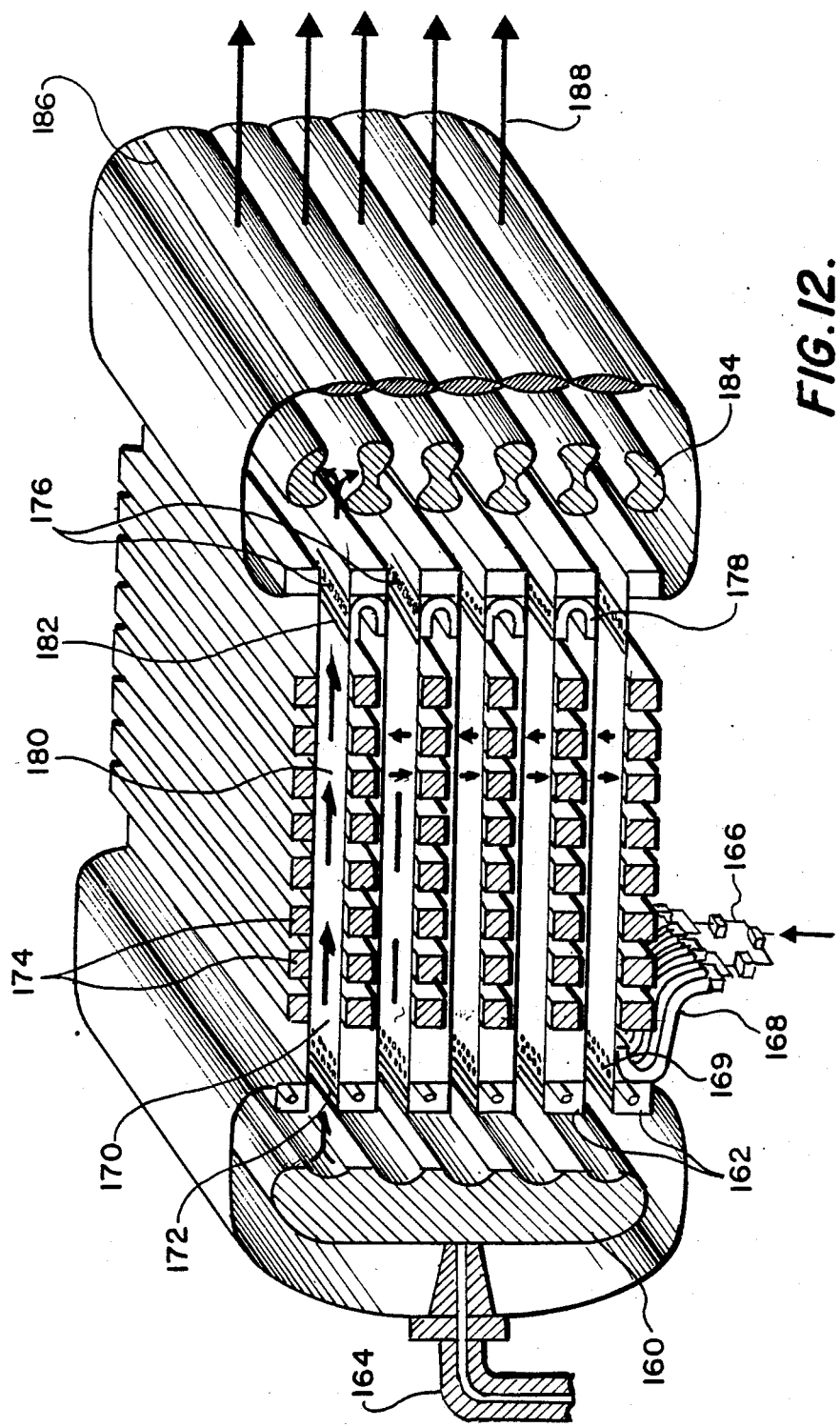
FIG. 12 is a perspective view of a fourth embodiment of an FEL module according to the present invention.

FIG. 12 depicts a fourth embodiment of an FEL module according to the present invention. The fourth embodiment depicted in FIG. 12 is similar to the embodiment depicted in FIG. 10. FIG. 12 shows the Bragg reflectors 172 at the input end of overmoded waveguides 180, and Bragg reflectors 182 near the output end of waveguides 180. The embodiments differ in that the module depicted in FIG. 12 has a depressed collector 184 that is open on the back side to allow radiation to escape. The embodiment depicted in FIG. 12 is particularly suitable for higher frequency operations between about 90-100 GHz, wherein the waves do not diffract as much as with lower frequencies and can pass through depressed collector 184. In FIG. 12, an input signal is input through phased priming input array 166 and hole couplers 168 that cooperate with slotted couplers 169. The E-beams 170 generated by the E-gun, which includes plasma chambers 162 and cathode 160, travel through overmoded Waveguides 180, whereupon wiggler magnets 174 impart an oscillating trajectory upon them to generate radiation. The radiation is coupled between adjacent waveguides 180 via slotted couplers 176 and waveguide couplers 178. In this embodiment, most of the millimeter radiation 188 travels through output lens 186 at the output end of the FEL module. The radiation output in the fourth embodiment depicted in FIG. 12 differs from the output in the embodiment depicted in FIG. 10 in that no quasi-parabolic antenna is used in FIG. 12.

Figure 13:
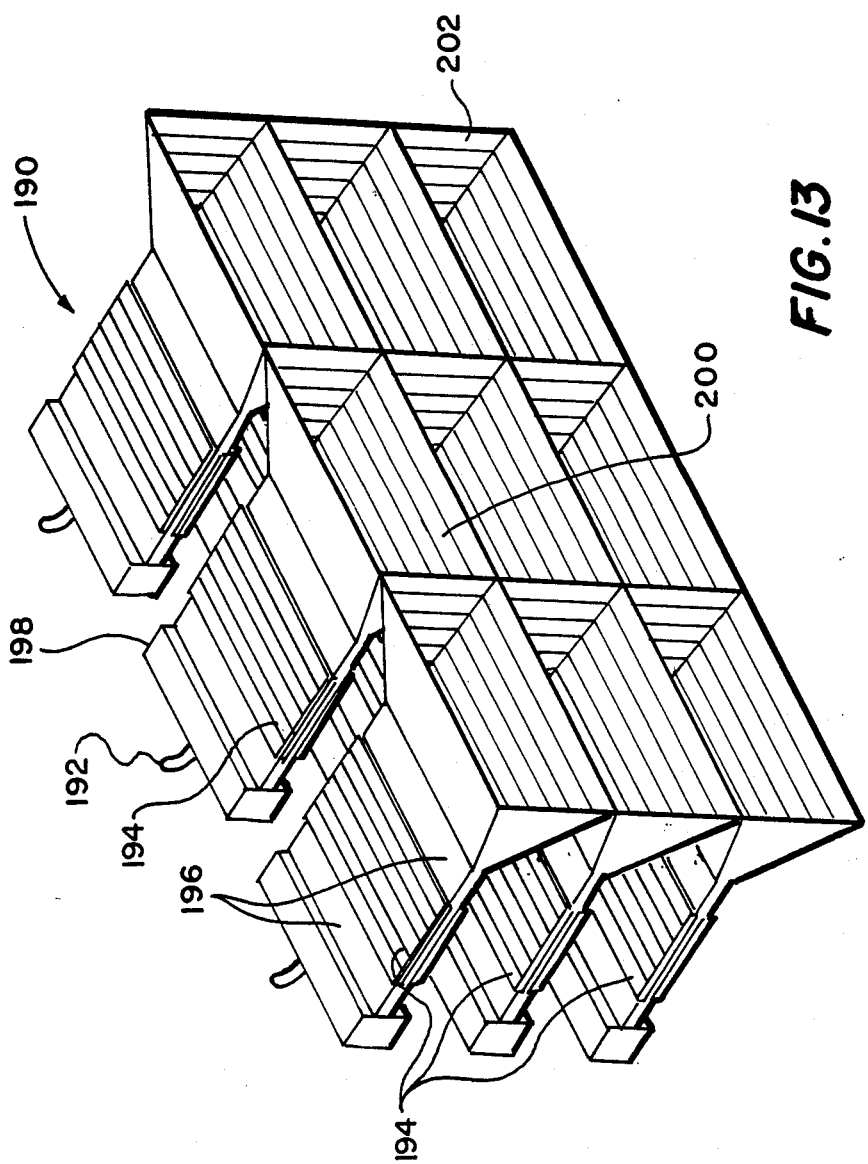
FIG. 13 depicts and array of adjacent FEL modules according to the present invention.

FIG. 13 depicts an array of adjacent FEL modules (FIG. 8) that may be used together to produce a high microwave power (HPM) ribbon beam FEL. In FIG. 13, a plurality of FEL modules, as described above, are used. Each FEL module has a power input cable 192, an E-gun 198, Bragg reflectors 196, wiggler magnet arrays 194 and an output horn 200. Alternatively, the FEL modules may share a common E-gun and power supply with the E-gun emitting a plurality of e-beams to the modules coupled with the E-gun. Output horns 200 include corrugated antennas 202. The output horns are designed to be oversized when compared with the rest of the module so that adjacent output horns in an array have no significant gaps between them. The purpose of this arrangement is to lessen the side lobes in the output radiation which would otherwise be caused by gaps between adjacent output horns 200. Each output horn 200 has a corrugated antenna 202 for steering the output radiation.

As shown in FIG. 13, wiggler magnet arrays 194 and Bragg reflector/resonators 196 have a wide planar configuration so that each FEL module utilizes a ribbon electron beam.

The use of a planar array of FEL modules reduces the power handling requirement imposed on the output optics of each module, and allows for beam steering through phase control of individual FEL modules. FIG. 11 shows how the radiation pattern of the array may be steered in the field. Changing the phase and mode with which each FEL module is primed will change the propagating direction and the far-field pattern. Also, changing the electron beam angle in the b direction will alter the angle of the emitted radiation 156 (horizontal steering). Changing the relative phase of individual modules in the array can be used to change the vertical steering angle. The phase of the output radiation from a particular module may differ from the phase of the module above or below it so that the FEL array's total output is steered in a vertical direction. By proper phasing, the electric field vectors of the individual FEL modules add coherently at a distant location, such as a target. When the FEL is used in a radar application, phasing of the modules may be used to provide information relating to the position or movement of a distant object.

The current density of the E-gun in each module is designed to lessen the requirement on the guiding magnetic field in the module to a point which allows control of the field by the wiggler magnet itself. Thus, the guiding magnetic field may be entirely eliminated.

A hypothetical example will illustrate certain features of the array depicted in FIG. 13. Assume that the output of the array is one hundred magawatts of microwave power at 10% efficiency. This output would require a 400 KV electron beam be used having a beam current of 2.5 kiloamps. A power source capable of 1 gigawatt would be needed. A beam area of 250 cm$^2$ (e.g. 4 cm by 6.25 cm) may be obtained using plasma-anode E-guns having a beam-current density of at least 10 A/cm$^2$. This beam area is compatible with an antenna array operating below the air breakdown limit and focusing at long range. An efficiently designed HPM FEL array of this type could be packaged into a less than 1 cubic meter volume. It would operate in the 2 to 100 GHz frequency range. Since the FEL operates at several hundred kilovolts and tens of kiloamps, relatively compact power systems could be built to operate the array.

While several illustrative embodiments of the invention have been shown and described, numerous modifications and alternate embodiments will occur to those skilled in the art. It is intended, therefore, that the invention not be limited solely to the described embodiments. Various modifications are contemplated and can be made without departing from the spirit and scope of the invention, as hereinafter defined by the appended claims.

We claim:

1. A free electron laser, comprising:
   an electron gun for generating an electron beam having a cathode and an anode;
   a waveguide cavity resonator section having an input end and an output end through which the electron beam passes;
   a phase priming array means coupled to said waveguide cavity section for accepting an input control signal and for outputting a priming signal having a preselected phase to said waveguide cavity section;
   wiggler means for varying the trajectory of electrons in the electron beam while the electrons pass through the waveguide cavity section at a frequency determined by the spacing of magnets in the wiggler means, the electrons emitting radiation; and
   output means for outputting the emitted radiation.

2. The free electron laser of claim 1, wherever said electron gun is a plasma-assisted electron gun.

3. The free electron laser of claim 1, wherein said electron gun is a plasma-anode electron gun, comprising:
   a cathode formed of a material that emits secondary electrons in a ratio to incident ions sufficiently high to provide a predetermined current requirement;
   a combined anode and ion source electrode structure, said structure including a pair of substantially hollow chambers each having a substantially rectangular and gridded inner surface which forms a passageway for secondary electrons emitted from said cathode;
   means for generating an ion plasma in said hollow chambers;
   means for biasing said cathode to substantial negative potential with respect to said combined anode and ion source structure;
   means for selectively releasing ions from said hollow chambers to impinge upon said cathode; and
   means for directing secondary electrons released from said cathode through said passageway into said waveguide cavity section.

4. The free electron laser of claim 1, wherein said electron gun is a plasma-assisted electron gun, comprising:
   a hollow cathode having multiple outlets;
   means for introducing an ionizable gas into the cathode;
   a perforated grid located adjacent to said multiple cathode outlets, said grid having apertures small enough to prevent the passage of plasma;
   means for establishing an electrical glow discharge between the cathode and the grid to generate a plasma within the cathode;
   a perforated anode on the opposite side of the grid from the cathode; and
   means for applying an electrical potential to said anode to extract an electron beam from the plasma behind the grid.

5. The free electron laser of claim 1, wherein said phase priming array means includes a plurality of hole couplers, each hole coupler being connected to a slot coupler in said waveguide cavity section.

6. The free electron laser of claim 1, wherein said phase priming array means includes at least one power splitter and at least one phase shifter.

7. The free electron laser of claim 1, further comprising:
   a tapered section located near the output end of said waveguide cavity section that collects output electrons, the tapered section being struck by the electrons in the electron beam at a small incident angle to reduce ionization.

8. The free electron laser of claim 1, further comprising:
   a first corrugated reflector, located inside the waveguide cavity section near the input end, that coherently reflects power of a radiation wave; and
   a second corrugated reflector, located inside the wavelength cavity section near the output end, that coherently reflects power of a radiation wave.

9. The free electron laser of claim 8, wherein both said first corrugated reflector and said second corrugated reflector include:
   a plurality of blazed vane means, linearly disposed inside said waveguide cavity section and perpendicular to the longitudinal axis of said waveguide cavity section, for coherently reflecting power of a radiation wave.

10. The free electron laser of claim 1, further comprising:

horizontal steering means for steering the emitted radiation in a horizontal direction.

11. The free electron laser of claim 10, wherein said horizontal steering means includes a steering magnet that directs the electron beam in a horizontal direction.

12. The free electron laser of claim 11, further comprising:
a thin corrugated reflector that coherently reflects the power of a radiation wave beyond the steering magnet.

13. The free electron laser of claim 1, further comprising:
a depressed collector that collects electrons that have passed through the waveguide cavity section.

14. A free electron laser, comprising:
an electron gun for generating a plurality of electron beams, said gun having a cathode and an anode;
a high voltage power source;
a free electron laser module having a plurality of module sections for producing radiation, each module section receiving an electron beam from said gun and each module section including:
a waveguide cavity section having an input end and an output end through which the electron beam passes;
wiggler means for varying the trajectory of electrons in the electron beam while the electrons pass through the waveguide cavity section at a frequency determined by the spacing of magnets in the wiggler means, the electrons emitting radiation; and
output means for outputting the emitted radiation.

15. The free electron laser of claim 14, further comprising:
a phase priming array means coupled to a waveguide cavity section of one of said module sections, said priming array means accepting an input control signal and outputting a priming signal having a preselected phase to said coupled waveguide cavity section.

16. The free electron laser of claim 15, wherein said phase priming array means includes a plurality of hole couplers, each hole coupler being connected to a slot coupler in said coupled waveguide cavity section.

17. The free electron laser of claim 15, wherein said phase priming array means includes at least one power splitter and at least one phase shifter.

18. The free electron laser of claim 14, wherein said electron gun is a plasma-anode electron gun that comprises:
a cathode formed of a material that emits secondary electrons in a ratio to incident ions sufficiently high to provide a predetermined current requirement;
a combined anode and ion source electrode structure, said structure including a pair of substantially hollow chambers each having a substantially rectangular and gridded inner surface which forms a passageway for secondary electrons emitted from said cathode;
means for generating an ion plasma in said hollow chambers;
means for biasing said cathode to a substantial negative potential with respect to said combined anode and ion source structure;
means for selectively releasing ions from said hollow chambers to impinge upon said cathode; and
means for directing secondary electrons released from said cathode through said passageway into said waveguide cavity section.

19. The free electron laser of claim 14, wherein said electron gun is a plasma-assisted electron gun comprising:
a hollow cathode having multiple outlets;
means for introducing an ionizable gas into the cathode;
a perforated grid located adjacent to said multiple cathode outlets, said grid having apertures small enough to prevent the passage of plasma;
means for establishing an electrical glow discharge between the cathode and the grid to generate a plasma within the cathode;
a perforated anode on the opposite side of the grid from the cathode; and
means for applying an electrical potential to said anode to extract an electron beam from the plasma behind the grid.

20. The free electron laser of claim 14, wherein each module section further comprises:
a tapered section located near the output end of said waveguide cavity section that collects output electrons, the tapered section being struck by the electrons in the electron beam at a small incident angle to reduce ionization.

21. The free electron laser of claim 14, wherein each module section further comprises:
a first corrugated reflector, located inside the waveguide cavity section near the input end, that coherently reflects power of a radiation wave; and
a second corrugated reflector, located inside the wavelength cavity section near the output end, that coherently reflects power of a radiation wave.

22. The free electron laser of claim 21, wherein both said both first corrugated reflector and said second corrugated reflector include:
a plurality of blazed vane means, linearly disposed inside said waveguide cavity section and perpendicular to the longitudinal axis of said waveguide cavity section, for coherently reflecting power of a radiation wave.

23. The free electron laser of claim 14, further comprising:
a depressed collector that collects electrons that have passed through the waveguide cavity sections.

24. A free electron laser, comprising:
an array of adjacent free electron laser modules for producing radiation having a reduced current density, each module comprising:
a high voltage power source;
an electron gun that generates an electron beam;
a waveguide cavity section having an input end and an output end through which the electron beam passes;
a phase priming array means coupled to said waveguide cavity section for accepting an input control signal and for outputting a priming signal having a preselected phase to said waveguide cavity section;
wiggler means for varying the trajectory of electrons in the electron beam while the electrons pass through the waveguide cavity section at a frequency determined by the spacing of magnets in the wiggler means, the electrons emitting radiation; and
output means for outputting the emitted radiation.

25. The free electron laser of claim 24, wherein said output means of each module includes an output horn having a horn output end, and adjacent output horns in the array are arranged such that there are no substantial gaps between the horn output ends of adjacent output horns.

26. The free electron laser of claim 24, wherein said electron gun is a plasma-anode electron gun that comprises:
   a cathode formed of a material that emits secondary electrons in a ratio to incident ions sufficiently high to provide a predetermined current requirement;
   a combined anode and ion source electrode structure, said structure including a pair of substantially hollow chambers each having a substantially rectangular and gridded surface which forms a passageway for secondary electrons emitted from said cathode;
   means for generating an ion plasma in said hollow chambers;
   means for biasing said cathode to a substantial negative potential with respect to said combined anode and ion source structure;
   means for selectively releasing ions from said hollow chambers to impinge upon said cathode; and
   means for directing secondary electrons released from said cathode through said passageway into said waveguide cavity section.

27. The free electron laser of claim 24, wherein said electron gun is a plasma-assisted electron gun comprising:
   a hollow cathode having multiple outlets;
   means for introducing an ionizable gas into the cathode;
   a perforated grid located adjacent to said multiple cathode outlets, said grid having apertures small enough to prevent the passage of plasma;
   means for establishing an electrical glow discharge between the cathode and the grid to generate a plasma within the cathode;
   a perforated anode on the opposite side of the grid from the cathode; and
   means for applying an electrical potential to said anode to extract an electron beam from the plasma behind the grid.

28. The free electron laser of claim 24, wherein said phase priming array means includes a plurality of hole couplers, each hole coupler being connected to a slot coupler in said waveguide cavity section.

29. The free electron laser of claim 24, wherein said phase priming array means includes at least one power splitter and at least one phase shifter.

30. The free electron laser of claim 24, further comprising:
   a tapered section located near the output end of said waveguide cavity section that collects output electrons, the tapered section being struck by the electrons in the electron beam at a small incident angle to reduce ionization.

31. The free electron laser of claim 24, further comprising:
   a first corrugated reflector, located inside the waveguide cavity section near the input end, that coherently reflects power of a radiation wave; and
   a second corrugated reflector, located inside the wavelength cavity section near the output end, that coherently reflects power of a radiation wave.

32. The free electron laser of claim 24, wherein both said both first corrugated reflector and said second corrugated reflector include:
   a plurality of blazed vane means, linearly disposed inside said waveguide cavity section and perpendicular to the longitudinal axis of said waveguide cavity section, for coherently reflecting power of a radiation wave.

33. The free electron laser of claim 24, further comprising:
   a depressed collector that collects electrons that have passed through the waveguide cavity section.

34. The free electron laser of claim 24, further comprising:
   vertical steering means for steering the emitted radiation in a vertical direction.

35. The free electron laser of claim 34, wherein said vertical steering means includes means for controlling the phase of the emitted radiation of at least one free electron laser module.

* * * * *